J. BOWLIN.
Culinary Boiler.

No. 133,918.          Patented Dec. 17, 1872.

WITNESSES

John Bowlin INVENTOR

By his Att'ys

Henry W. Williams

UNITED STATES PATENT OFFICE

JOHN BOWLIN, OF CHARLESTOWN, MASSACHUSETTS, ASSIGNOR OF ONE-HALF HIS RIGHT TO GILES BENNETT, OF NORTH SALEM, N. H.

IMPROVEMENT IN CULINARY BOILERS.

Specification forming part of Letters Patent No. 133,918, dated December 17, 1872.

*To all whom it may concern:*

Be it known that I, JOHN BOWLIN, of Charlestown, in the county of Middlesex and State of Massachusetts, have invented a new and useful Improvement in Vessels intended to be used in Heating Water, &c., or in making coffee, tea, and the like, of which the following is a specification:

My object is to provide a heater which can be used in connection with a kerosene-lamp or gas-burner, as well as under other circumstances. The nature of my invention is fully described below.

Figure 1:
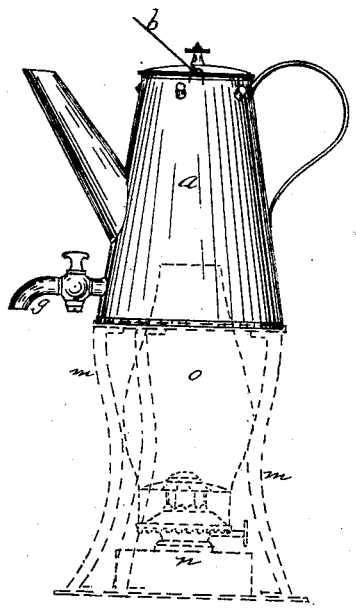
Figure 4:
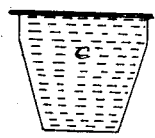
Figure 2:
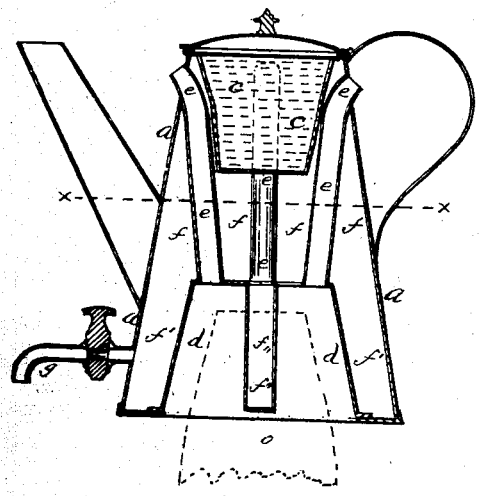
Figure 3:
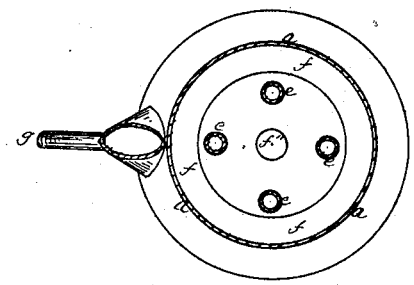

In the accompanying drawing, Figure 1 is an elevation of a vessel embodying my invention, said vessel being represented as resting upon a frame and over a kerosene-lamp, both of which are represented by broken lines; Fig. 2 is a vertical section of the same, the position of the lamp-chimney being represented by broken lines; Fig. 3 is a horizontal section of the same in the direction and position of the line $x\,x$; and Fig. 4 is a view of the strainer used in making tea, coffee, &c.

Similar letters of reference indicate corresponding parts.

$a$ represents a tea-pot or coffee-pot. $b$ is the bail. $c$ is the strainer, to be used when desired. $d$ is a recess in the bottom of the vessel $a$ large enough to allow the chimney of a lamp to enter. $e\,e\,e\,e$ are tubes or passages extending from the recess $d$ through the vessel $a$ to the outside. These tubes are made, of course, perfectly water-tight. $f f' f''$ is the inside of the vessel $a$, where the liquid is to heat. $f'$ is that portion extending down and outside the lamp-chimney, and $f''$ is that portion which extends down into the said chimney. $g$ is a cock by means of which water or other liquid can be drawn from the vessel $a$. $m\,n\,o$, represented by broken lines, are, respectively, a standard upon which the vessel $a$ rests, a lamp, and a chimney.

In practical operation, as will readily be seen, when the vessel $a$ is placed upon or over a kerosene-lamp, as seen in Fig. 1, the heat from the flame passes up the chimney $o$ into the recess $d$, and, after heating quickly the projecting parts $f'' j' f'$, passes up and out through the tubes $e\,e\,e\,e$. It will be seen, therefore, that there is no large space which is not directly heated by some portion of the vessel or tubes.

In large vessels, or those of different shapes, connecting-tubes could be carried from $f''$ to $f'$, or from one tube $e$ to another.

I do not confine myself to a tea or coffee pot in which are placed the tubes above described; neither do I confine myself to a vessel of any particular shape, size, or material. Any kind of liquid may be heated in vessels thus arranged, and vessels useful to barbers, in hospitals, sick rooms, refreshment saloons, &c., can be readily made with my improvement.

By means of the strainer, tea and coffee can be made over a lamp as quickly as upon a stove.

By arranging a suitable frame a gas-burner can be brought into use, the flame being in the recess $d$.

A vessel could be made for use upon a stove, if desired, without the recess $d$, and having the tubes extend to the flat bottom.

The advantages of being able to heat water, make tea, &c., in families, boarding-houses, &c., without using a stove, especially in the summer season, are too obvious to need comment.

Having thus fully described my invention, what I claim, and desire to secure by Letters Patent, is—

The combination and arrangement of the vessel $a$, or its equivalent, the portions $f f' f''$, the recess $d$, and tubes $e\,e\,e\,e$, arranged and constructed substantially as and for the purposes hereinbefore described.

JOHN BOWLIN.

Witnesses:
HENRY W. WILLIAMS,
E. H. OBER.